US012746877B2

(12) United States Patent
Baur et al.

(10) Patent No.: US 12,746,877 B2
(45) Date of Patent: Sep. 29, 2026

(54) VEHICULAR ELECTROCHROMIC REARVIEW MIRROR ASSEMBLY

(71) Applicant: Magna Mirrors of America, Inc., Holland, MI (US)

(72) Inventors: Michael J. Baur, Kentwood, MI (US); John T. Uken, Jenison, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 270 days.

(21) Appl. No.: 18/732,751

(22) Filed: Jun. 4, 2024

(65) Prior Publication Data

US 2024/0409028 A1 Dec. 12, 2024

Related U.S. Application Data

(60) Provisional application No. 63/506,413, filed on Jun. 6, 2023.

(51) Int. Cl.

| | |
|---|---|
| ***B60R 1/04*** | (2006.01) |
| ***B60R 1/08*** | (2006.01) |
| *B60R 1/12* | (2006.01) |

(52) U.S. Cl.

CPC ................ *B60R 1/04* (2013.01); *B60R 1/088* (2013.01); *B60R 2001/1253* (2013.01)

(58) Field of Classification Search

CPC ... B60R 1/04; B60R 1/088; B60R 2001/1253; B32B 17/10174; B32B 17/1022; B32B 17/10513; B32B 17/10541; B32B 17/10761; B32B 2307/416; B32B 2551/08; G02F 1/157

See application file for complete search history.

(56) References Cited

U.S. PATENT DOCUMENTS

| | | | |
|---|---|---|---|
| 4,712,879 | A | 12/1987 | Lynam et al. |
| 5,073,012 | A | 12/1991 | Lynam |
| 5,076,673 | A | 12/1991 | Lynam et al. |
| 5,115,346 | A | 5/1992 | Lynam |
| 5,140,455 | A | 8/1992 | Varaprasad et al. |
| 5,142,407 | A | 8/1992 | Varaprasad et al. |
| 5,151,816 | A | 9/1992 | Varaprasad et al. |
| 5,253,109 | A | 10/1993 | O'Farrell et al. |
| 5,406,414 | A | 4/1995 | O'Farrell et al. |

(Continued)

*Primary Examiner* — Jonathan Y Jung

(74) *Attorney, Agent, or Firm* — HONIGMAN LLP

(57) ABSTRACT

A vehicular electrochromic rearview mirror assembly includes a mirror head accommodating an electrochromic mirror reflective element, which includes a front glass substrate and a rear glass substrate, with an electrochromic medium disposed between the substrates. The rear glass substrate has notched portions and corresponding portions of the front glass substrate extend beyond the respective notched portions of the rear glass substrate. Electrically conductive connectors extend along the respective notched portions of the rear glass substrate and electrically conductively connect between the electrically conductive coating at the rear glass substrate and respective electrical connectors at the rear glass substrate. The electrically conductive coating includes a first region electrically conductively connected to one electrical connector and electrically isolated from a second region electrically conductively connected to another electrical connector.

39 Claims, 13 Drawing Sheets

(56) References Cited

U.S. PATENT DOCUMENTS

| | | | |
|---|---|---|---|
| 5,525,264 A | 6/1996 | Cronin et al. | |
| 5,567,360 A | 10/1996 | Varaprasad et al. | |
| 5,610,756 A | 3/1997 | Lynam et al. | |
| 5,668,663 A | 9/1997 | Varaprasad et al. | |
| 5,724,187 A | 3/1998 | Varaprasad et al. | |
| 5,798,688 A | 8/1998 | Schofield | |
| 5,910,854 A | 6/1999 | Varaprasad et al. | |
| 6,002,511 A | 12/1999 | Varaprasad et al. | |
| 6,154,306 A | 11/2000 | Varaprasad et al. | |
| 6,178,034 B1 | 1/2001 | Allemand et al. | |
| 6,690,268 B2 | 2/2004 | Schofield et al. | |
| 7,184,190 B2 | 2/2007 | McCabe et al. | |
| 7,195,381 B2 | 3/2007 | Lynam et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,360,932 B2 | 4/2008 | Uken et al. | |
| 7,626,749 B2 | 12/2009 | Baur et al. | |
| 8,049,640 B2 | 11/2011 | Uken et al. | |
| 8,277,059 B2 | 10/2012 | McCabe et al. | |
| 8,508,831 B2 | 8/2013 | De Wind et al. | |
| 8,529,108 B2 | 9/2013 | Uken et al. | |
| 8,730,553 B2 | 5/2014 | De Wind et al. | |
| 9,174,578 B2 | 11/2015 | Uken et al. | |
| 9,346,403 B2 | 5/2016 | Uken et al. | |
| 9,598,016 B2 | 3/2017 | Blank et al. | |
| 9,827,913 B2 | 11/2017 | De Wind et al. | |
| 2010/0085653 A1 | 4/2010 | Uken et al. | |
| 2014/0022390 A1* | 1/2014 | Blank | B60R 1/02 348/148 |
| 2014/0293169 A1* | 10/2014 | Uken | B60R 1/12 349/12 |
| 2016/0114731 A1* | 4/2016 | Habibi | G02F 1/157 345/173 |
| 2020/0269760 A1* | 8/2020 | De Wind | G02F 1/153 |
| 2020/0398757 A1* | 12/2020 | Baur | B60R 1/12 |
| 2023/0373394 A1 | 11/2023 | Baur et al. | |

* cited by examiner

| Chrome Band Width | Front/Back glass offset | Comments |
| --- | --- | --- |
| 6.1 | 2.6 | Glass offset enables "True frameless," which is the Housing ≤ glass all around |
| ~4.8 | 1.3 | Reduced glass offset requires "Pseudo-frameless," which is the Housing > glass all around |
| ~3.5-4 | 0 | Future EC Cell construction [EC Cell (front) / EC Cell (back)] |

VEHICULAR ELECTROCHROMIC REARVIEW MIRROR ASSEMBLY

CROSS REFERENCE TO RELATED APPLICATION

The present application claims the filing benefits of U.S. provisional application Ser. No. 63/506,413, filed Jun. 6, 2023, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a single ball pivot or joint mounting configuration or double ball pivot or joint mounting configuration where the mirror casing and reflective element are adjusted relative to the interior portion of a vehicle by pivotal movement about the single or double ball pivot configuration. The mirror reflective element may comprise an electrochromic mirror reflective element comprising a front glass substrate and a rear glass substrate with an electrochromic medium sandwiched between the glass substrates and bounded by a perimeter seal.

SUMMARY OF THE INVENTION

An interior rearview mirror assembly includes a mounting structure configured to attach at an interior portion of a cabin of a vehicle equipped with the vehicular electrochromic rearview mirror assembly. A mirror head accommodates an electrochromic mirror reflective element. With the mounting structure attached at the interior portion of the cabin of the vehicle, the mirror head is adjustable by a driver of the vehicle to set a rearward view for the driver. The electrochromic mirror reflective element includes a front glass substrate having a first side and a second side separated from the first side by a thickness of the front glass substrate. The front glass substrate has an outer peripheral edge that spans between the first side and the second side. The electrochromic mirror reflective element includes a rear glass substrate having a third side and a fourth side separated from the third side by a thickness of the rear glass substrate. The rear glass substrate has an outer peripheral edge that spans between the third side and the fourth side. The peripheral edges of the front glass substrate and the rear glass substrate may be generally aligned or flush with one another. For example, an offset or overhang between the outer peripheral edge of the front glass substrate and the outer peripheral edge of the rear glass substrate, at least along an upper or lower region of the mirror reflective element, is reduced or minimized (e.g., with the offset being less than two millimeters, less than one millimeter, less than half of a millimeter, zero millimeters or the like). The rear glass substrate has a first notched portion and a second notched portion. Corresponding portions of the front glass substrate extend beyond the first notched portion and the second notched portion of the rear glass substrate. A mirror reflector is disposed at the rear glass substrate. A transparent electrically conductive coating is disposed at the second side of the front glass substrate. An electrically conductive coating is disposed at the third side of the rear glass substrate. The electrochromic mirror reflective element includes an electrochromic medium disposed between the front glass substrate and the rear glass substrate and bounded by a perimeter seal. The electrochromic medium is in electrically conductive contact with the transparent electrically conductive coating disposed at the second side of the front glass substrate and with the electrically conductive coating disposed at the third side of the rear glass substrate. A first electrically conductive connector extends along the first notched portion of the rear glass substrate and electrically conductively connects between the electrically conductive coating at the third side of the rear glass substrate and a first electrical connector at the fourth side of the rear glass substrate. A second electrically conductive connector extends along the second notched portion of the rear glass substrate and electrically conductively connects between the electrically conductive coating at the third side of the rear glass substrate and a second electrical connector at the fourth side of the rear glass substrate.

These and other objects, advantages, purposes and features of the present invention will become apparent upon review of the following specification in conjunction with the drawings.

DESCRIPTION OF THE PREFERRED EMBODIMENTS

Figure 1:
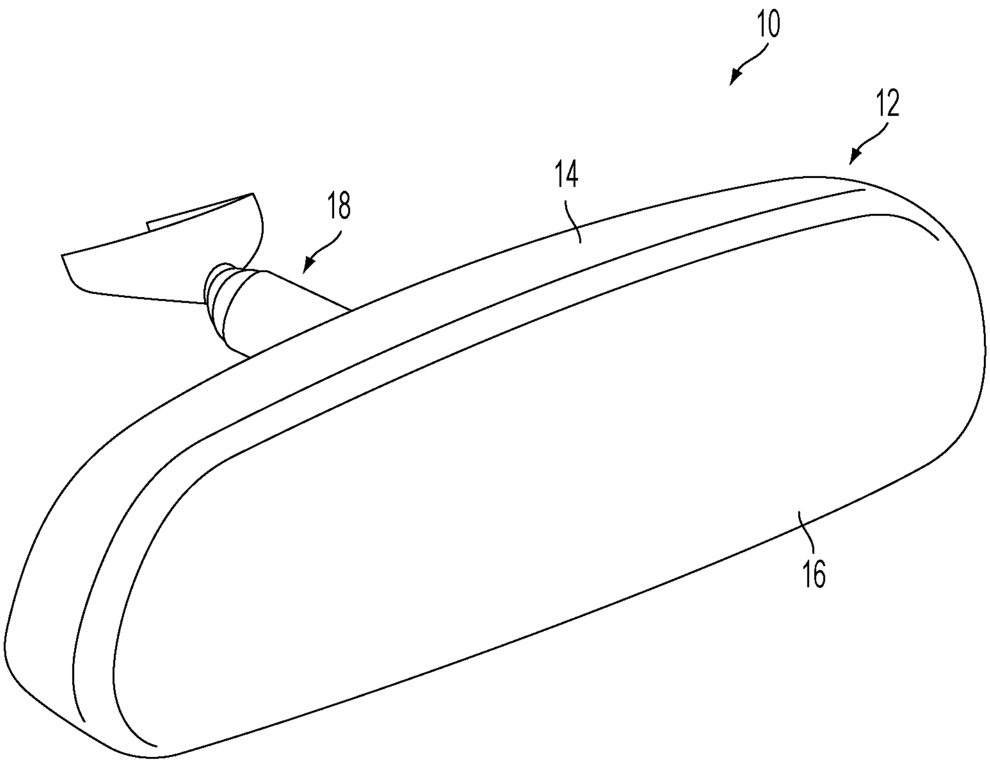
FIG. 1 is a perspective view of an interior rearview mirror assembly.

Referring now to the drawings and the illustrative embodiments depicted therein, a vehicular interior rearview mirror assembly 10 includes a mirror head 12 that includes a casing 14 and a reflective element 16 positioned at a front portion of the casing 14 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The mirror reflective element includes a variable reflectance mirror reflective element that varies its reflectance responsive to electrical current applied to conductive coatings or layers of the reflective element.

Figure 2:
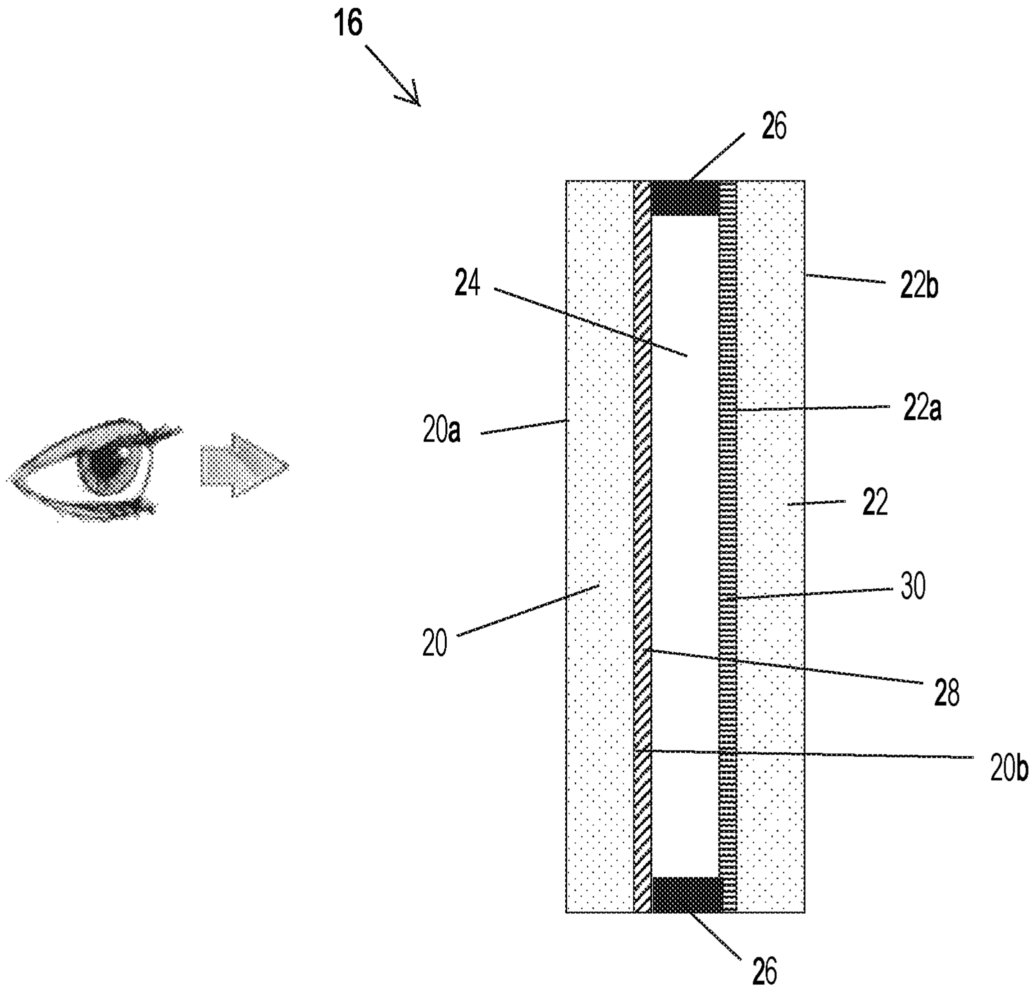
FIG. 2 is a sectional view of the mirror reflective element of the mirror assembly of FIG. 1.

In the illustrated embodiment, and as shown in FIG. 2, the mirror reflective element 16 comprises a laminate construction variable reflectance electro-optic (such as electrochromic) reflective element assembly having a front substrate 20 and a rear substrate 22 with an electro-optic medium 24 (such as an electrochromic medium) sandwiched therebetween and bounded by a main seal or perimeter seal 26. As shown in FIG. 2, the front substrate 20 has a front or first surface 20*a* (the surface that generally faces the driver of a vehicle when the mirror assembly is normally mounted at the vehicle) and a rear or second surface 20*b* opposite the front surface 20*a*, and the rear substrate 22 has a front or third surface 22*a* and a rear or fourth surface 22*b* opposite the front surface 22*a*, with the electro-optic medium 24 disposed between the second surface 20*b* and the third surface 22*a* and bounded by the perimeter seal 26 of the reflective element. The second surface 20*b* of the front glass substrate 20 has a transparent conductive coating 28 established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface 22*a* of the rear glass substrate 22 has a metallic reflector coating 30 (or multiple layers or coatings) established thereat. The front or third surface 22*a* of the rear substrate 22 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element).

The third surface 22*a* defines the active EC area or surface of the rear substrate within the perimeter seal 26. The coated third surface 22*a* may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

The mirror assembly may comprise a frameless mirror assembly, where the front glass substrate may have an exposed rounded perimeter glass edge that provides a curved transition from the planar first surface of the front glass substrate to an outer less curved surface of the mirror casing (such as by utilizing aspects of the mirror assemblies described in U.S. Pat. Nos. 9,827,913; 9,174,578; 8,508,831; 8,730,553; 9,598,016 and/or 9,346,403, which are hereby incorporated herein by reference in their entireties). Optionally, the mirror assembly may include a casing portion that circumscribes the perimeter glass edge of the front glass substrate and provides the curved transition from the planar first surface of the front glass substrate to an outer less curved surface of the mirror casing, with the mirror casing portion not encroaching onto or overlapping the planar front or first surface of the front glass substrate (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties).

Figure 3:
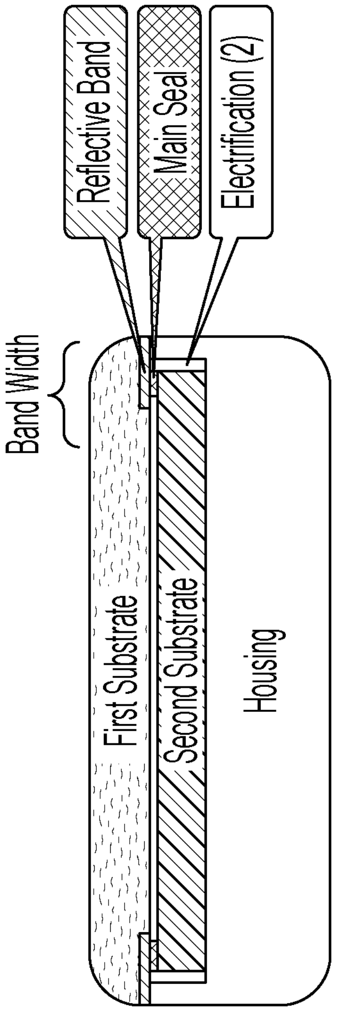
FIG. 3 is a sectional view of a mirror assembly with the rear glass substrate of the mirror reflective element nested in the mirror casing.

As shown in FIG. 3, frameless mirrors may use an offset between the front or first substrate and the rear or second substrate to achieve mounting and electrification. That is, the front substrate is overlaid at the rear substrate so that a perimeter edge region of the front substrate extends beyond an outer peripheral edge of the rear substrate (in some applications, no part of the rear glass substrate extends to or beyond any peripheral part of the front glass substrate, such that the edges of the front glass substrate extend beyond the edges of the front glass substrate). Electrical connectors (e.g., electrically conductive coatings or layers and/or electrically conductive epoxy material or the like) extend along the peripheral edges of the rear substrate toward the second surface of the front substrate to electrically connect a power source to the conductive layers at the third surface of the rear substrate and/or the second surface of the front substrate. The mirror reflective element attaches at the mirror casing via any suitable means, such as, for example, via snap attachment of a mirror backing plate that is adhered at the fourth surface of the rear glass substrate to the mirror casing, or optionally via an adhesive disposed between the second surface of the front substrate and a surface of the mirror casing and/or an adhesive disposed between the fourth surface of the rear substrate and a surface of the mirror casing. A reflective band is deposited on the second surface of the front substrate to conceal the portion of the housing, the perimeter seal, and the electrical connectors that extend along the peripheral edge of the rear substrate.

Referring to FIGS. 4-8, the rear substrate 22 includes one or more layers of electrically conductive material 30 at the third surface 22a of the rear substrate 22 and a layer of electrically conductive material is disposed at the second surface 20b of the front substrate 20 (e.g., the transparent conductive material 28). With the rear substrate 22 mated to the front substrate 20, the electrochromic medium 24 is sandwiched between and in electrically conductive contact with the layer of electrically conductive material 30 at the third surface 22a of the rear substrate 22 and the layer of electrically conductive material at the second surface 20b of the front substrate 20, and bounded by the main seal or perimeter seal 26.

Figure 5:
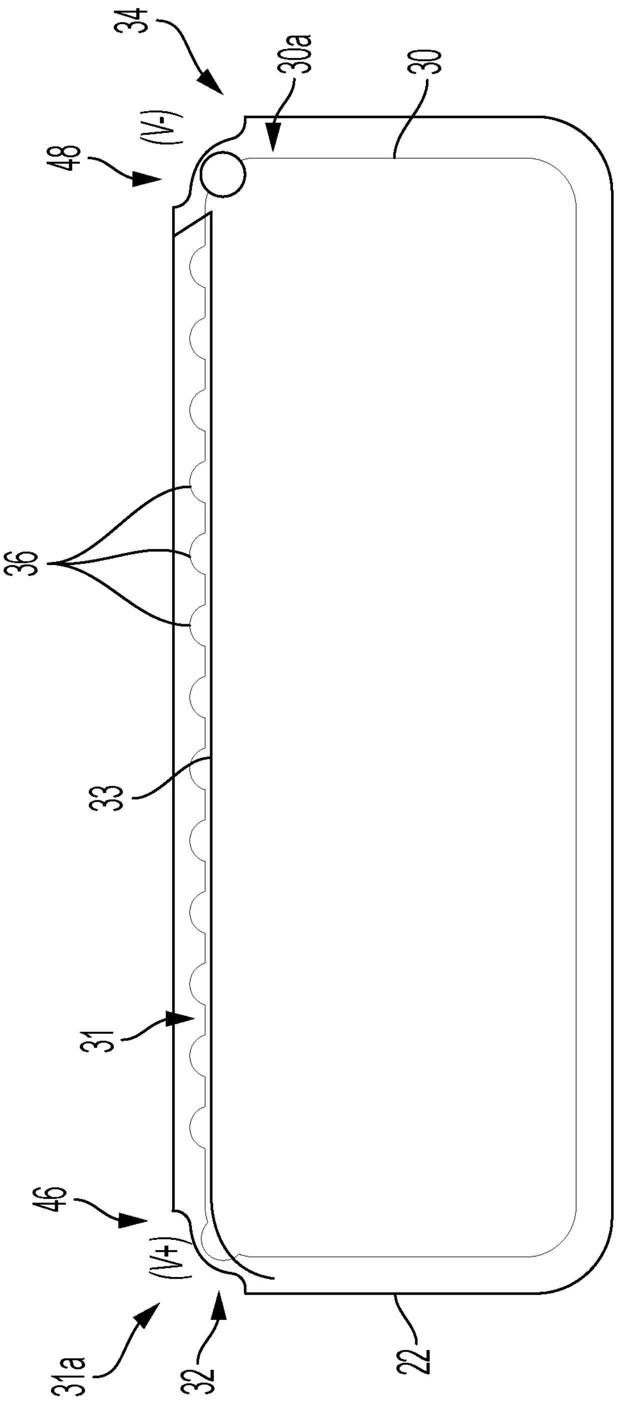
FIG. 5 is a plan view of the rear glass substrate of the mirror reflective element of the mirror assembly of FIG. 1.

One or more electrical connectors may be disposed at the fourth surface 22b of the rear substrate 22 for electrically connecting the electrically conductive coatings to a power source of the vehicle. The front substrate 20 and the rear substrate 22 substantially overlap so that the respective peripheral edges of the front substrate 20 and the rear substrate 22 are generally aligned along substantially the entire perimeter of the mirror reflective element. As shown in FIG. 5, the rear glass substrate 22 includes a first cutout region 32 and a second cutout region 34 so that electrical connection can be made between the fourth surface 22b of the rear substrate 22 and the electrically conductive material at the third surface 22a of the rear substrate 22 and the electrically conductive material at the second surface 20b of the front substrate 20.

As also shown in FIG. 5, the third surface electrically conductive coating 30 has a primary region 30a that spans the reflective region of the mirror reflective element and includes an electrical connection tab out region 30b at the cutout region 34 for electrical connection to the third surface electrically conductive coating at the primary region of the rear glass substrate. The third surface electrically conducting coating 30 also has a connecting portion 31 that extends along a perimeter edge region of the rear glass substrate and that includes an electrical connection tab out region 31a at the cutout region 32 for electrical connection to the second surface transparent electrically conductive coating at the second surface of the front glass substrate. The connecting portion 31 is electrically isolated from the primary region 30a by an isolation line 33 (e.g., an etched or ablated, such as laser ablated, isolation line established through the electrically conductive coating so that the isolation line is devoid of electrically conductive material). The isolation line 33 thus separates the electrically conductive coating 30 into two separate circuits for dimming the mirror reflective element.

Figure 6:
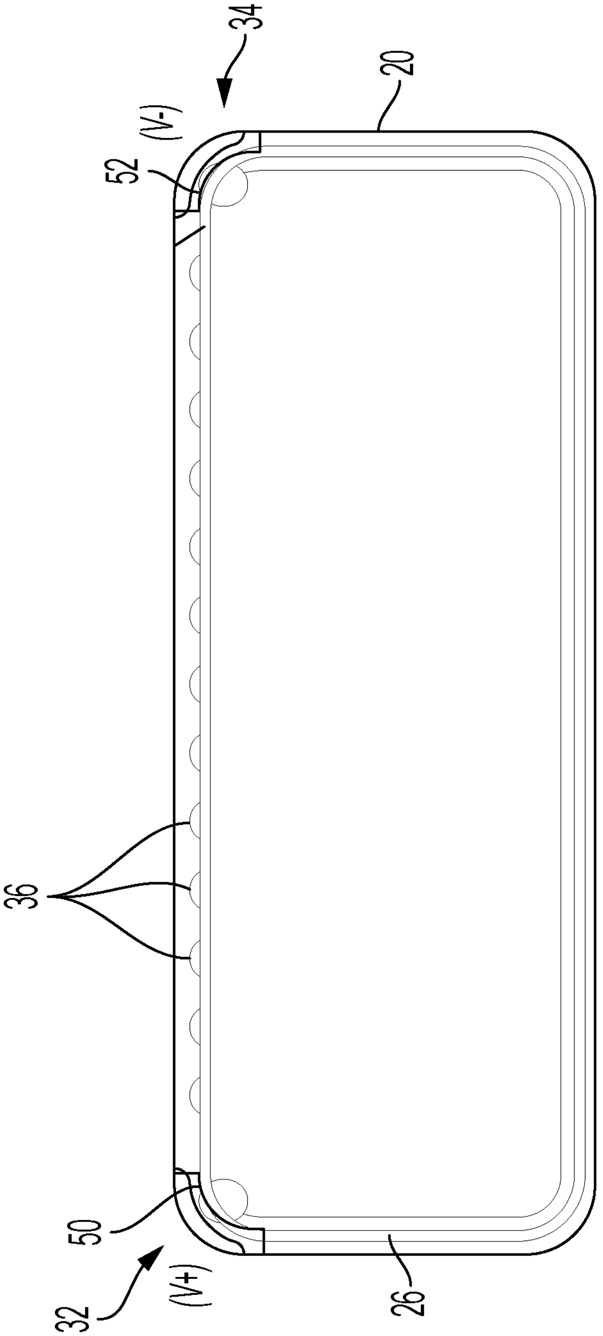
FIG. 6 is a plan view of the mirror reflective element of the mirror assembly of FIG. 1, shown with the front glass substrate overlaid on the rear glass substrate of FIG. 5.

As shown in FIG. 6, an outer edge region of the front glass substrate 20 extends at least partially beyond the first cutout region or notched or recessed portion 32 of the outer edge of the rear substrate 22 and electrical connection between the fourth surface 22b of the rear substrate 22 and the connecting portion 31 at the third surface 22a of the rear substrate 22 may be made at the first cutout region 32. Similarly, the outer edge region of the front substrate 20 extends at least partially beyond the second cutout region or notched or recessed portion 34 of the outer edge of the rear substrate 22 and electrical connection between the fourth surface 22b of the rear substrate 22 and the primary region 30a of the electrically conductive coating 30 at the third surface of the rear glass substrate may be made at the second cutout region 34.

In the illustrated example, the first cutout region 32 and the second cutout region 34 are at opposing corners or sides of the mirror reflective element along the upper edge of the mirror reflective element. Except for the first cutout region 32 and the second cutout region 34, the respective peripheral edges of the front substrate 20 and the rear substrate 22 are generally or substantially aligned or flush with one another (e.g., with upper and lower peripheral edges of the front glass substrate extending no more than about one millimeter beyond the respective upper and lower peripheral edges of the rear glass substrate). Thus, an offset between the outer peripheral edge of the front glass substrate 20 and the rear glass substrate 22 is reduced or minimized (e.g., the offset may be about two millimeters or less, one millimeter or less, one half of a millimeter or less, zero millimeters or the like), such as along at least one of the upper peripheral edge of the mirror reflective element, the lower peripheral edge of the mirror reflective element, and the lateral peripheral edges of the mirror reflective element. In other words, the front glass substrate geometry is about the same relative size as the rear glass substrate, except for the cut outs in the rear glass substrate at the electrification corners.

The connecting portion 31 of the electrically conductive material 30 at the third surface of the rear substrate 22 includes a plurality of bulges or protrusions 31b arranged along the edge region of the mirror reflective element between the first cutout region 32 and the second cutout region 34. When the front and rear glass substrates are joined together with the perimeter seal 26, the bulges protrude outboard of the perimeter seal 26. The bulges in the third surface reflector material allow for application of electrically conductive material to electrically stitch together the conductive surfaces (i.e., the transparent electrically conductive coating at the second surface of the front substrate and the connecting portion 31 at the third surface of the rear substrate). For example, electrically conductive paste or epoxy or joining material 36 may be applied at the bulges 31b prior to mating the front substrate 20 and the rear substrate 22 to connect the second surface transparent electrically conductive layer to the connecting portion or third surface electrification circuit. The electrically conductive joining material 36 may be disposed at and along the bulges 31b of the connecting portion of the third surface electrically conductive material 30 to electrically conductively connect the connecting portion at the third surface and the transparent electrically conductive coating at the second surface along the edge region of the mirror reflective element 16 between the first cutout region 32 and the second cutout region 34.

That is, electrically conductive traces (e.g., traces of the electrically conductive joining material) may be disposed along the electrically conductive coating of the connecting portion 31 to conduct electrical current from the first cutout region 32 to the transparent electrically conductive coating at the second surface of the front substrate. The traces along the electrically conductive coating may have a thickness of 0.5 millimeters or less, 0.3 millimeters or less, 0.2 millimeters or less and the like. If shorter conductors are arranged in the design, the thickness may be narrower. Optionally, the third surface electrically conductive coating 30 may be extended as needed (e.g., to a peripheral edge of the mirror reflective element) to provide a region for electrically conductively connecting the third surface and the second surface along the upper edge of the mirror reflective element.

Figure 4:
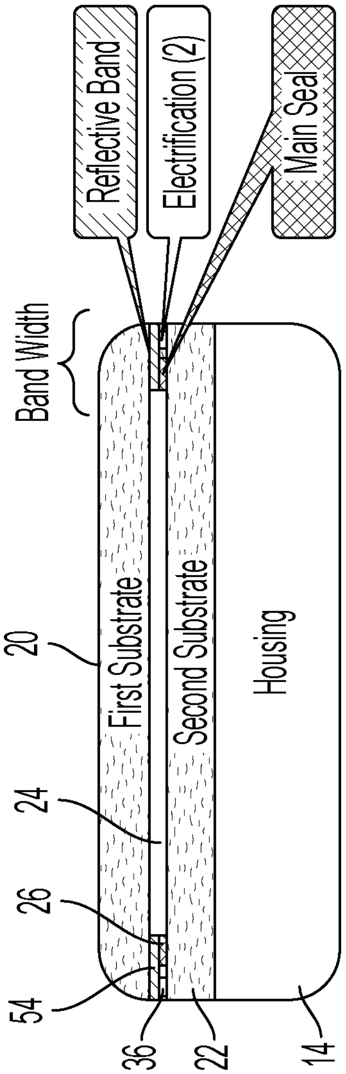
FIG. 4 is a sectional view of the mirror assembly of FIG. 1.

As shown in FIGS. 4 and 6, when the front substrate 20 and the rear substrate 22 are mated together, the main seal 26 is disposed between the front substrate 20 and the rear substrate 22 and circumscribes a perimeter edge region of the mirror reflective element. In the illustrated embodiment, the seal 26 is disposed along and may at least partially fill in the isolation line 33 to further electrically isolate the connecting portion 31 from the primary region 30a of the electrically conductive coating 30. The bulges 31b extend outboard of the main seal 26 and the joining material 36 is disposed outboard of the main seal 26 and extends between the third surface 22*a* and the second surface 20*b*.

Thus, and with reference to FIG. 5, the isolation line or ablation line 33 is formed along the third surface electrically conductive material 30 and between the first cutout region 32 and the second cutout region 34. The ablation line 33 electrically isolates a first electrically conductive region (the connecting portion 31) of the third surface conductive material that is electrically conductively connected with the first cutout region 32 and a second electrically conductive region (the primary region 30*a*) of the third surface conductive material that is electrically conductively connected with the second cutout region 34. In the illustrated example, a positive electrical connector 46 is electrically connected to the tab or portion 31*a* at the first cutout region 32 and a negative electrical connector 48 is electrically connected to the tab or portion 30*b* at the second cutout region 34. In other words, the ablation line 33 creates two independent thin circuits within the third surface conductor. This thin circuit may replace the application of conductive paste along the surface. Positive and negative leads can be reversed, such as to improve color performance.

Further, and as shown in FIG. 6, a second ablation line 50 may be formed through the transparent electrically conductive coating (such as via etching or laser ablating or the like) along the second surface of the front substrate at or near the first cutout region 32 and a third ablation line 52 may be formed along the second surface of the front substrate at or near the second cutout region 34 to isolate the corresponding regions of the transparent electrically conductive coatings from respective circuits. Thus, the first electrically conductive region or connecting portion 31 of the third surface electrically conductive material 30 along the upper edge region of the mirror reflective element is electrically conductively connected to the positive electrical connector 46 and electrically conductively connected to the transparent electrically conductive material at the second surface of the front substrate 20 via the joining material 36. The second electrically conductive region of the third surface electrically conductive material 30 is electrically conductively connected to the negative electrical connector 48.

In other words, the positive electrical connector 46 is electrically connected to connecting portion 31 of the third surface conductive material and the negative electrical connector 48 is electrically connected to the primary region 30*a* of the third surface conductive material. The connecting portion 31 and the primary region 30*a* are electrically isolated from one another by the isolation line 33 and the primary seal 26 (which is disposed over and along the isolation line and may fill in the isolation line to further electrically isolate the connecting portion 31 from the primary region 30*a*). The connecting portion 31 of the third surface conductive material is electrically connected to the second surface conductive material via the conductive joining material 36 disposed at the bulges 31*b*. The positive electrical connector 46 may be electrically isolated from the second surface joining material by the second ablation line 50 and the negative electrical connector 48 is electrically isolated from the second surface joining material by the third ablation line 52.

The electrical connectors may comprise any suitable electrically conductive element so that electrical supply to the third surface circuits may be provided at the offset in the rear glass substrate. For example, the respective electrically conductive regions may electrically connect to the fourth surface of the rear glass substrate via an electrically conductive tab or film or epoxy or flexible circuit that extends along the edge of the rear substrate between the fourth surface and the third surface and/or the second surface.

The electrically conductive connectors or tabs may be any suitable size, such as one millimeter or less if ablated to width. Optionally, the tabs may be created from a coating mask. Because a robust coating mask can create some uneven deposition in the coating thickness, the coating mask must be sufficient in size for a full effective thin film coating (e.g., one millimeter or greater). The tab area of the coating may be about 3.5 millimeters or greater in length. Masking may be supplemented with laser ablating to provide a hybrid tab region. Optionally, an electrification pad can be disposed at the second surface of the front substrate and aligned with the cutout regions so that a spring-loaded or biased extendable/retractable electrically conductive pin or other electrical connector may extend between the second surface and the fourth surface.

Figure 7:
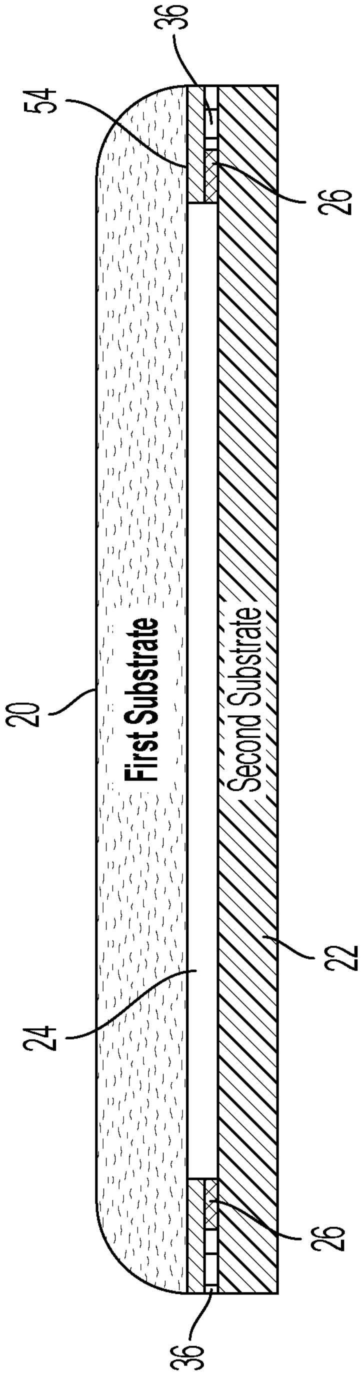
FIG. 7 is another sectional view of the mirror reflective element of the mirror assembly of FIG. 1.
Figure 8:
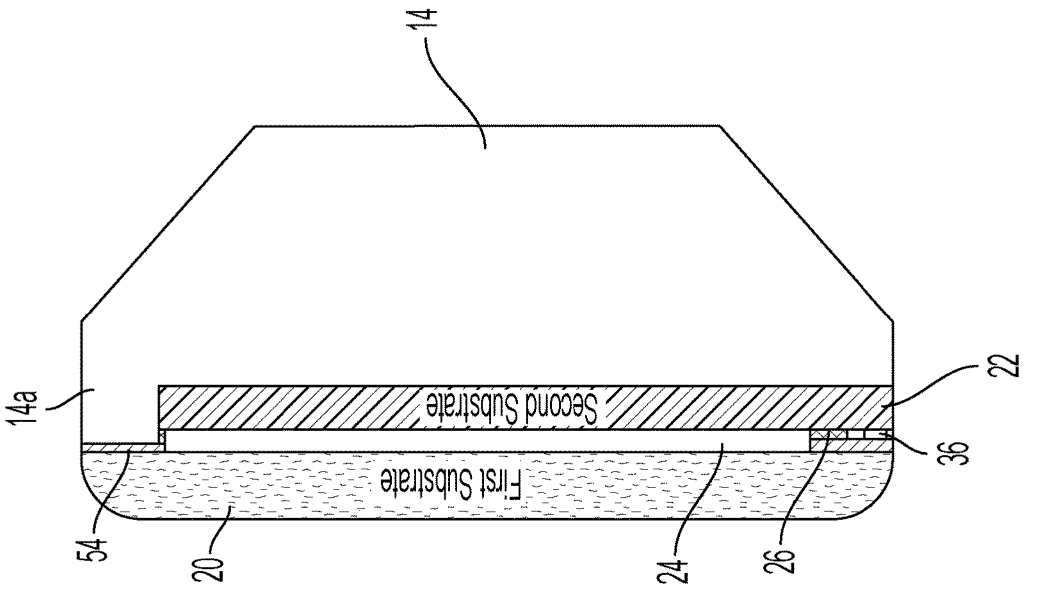
FIG. 8 is another sectional view of the mirror assembly of FIG. 1.
Figure 9:
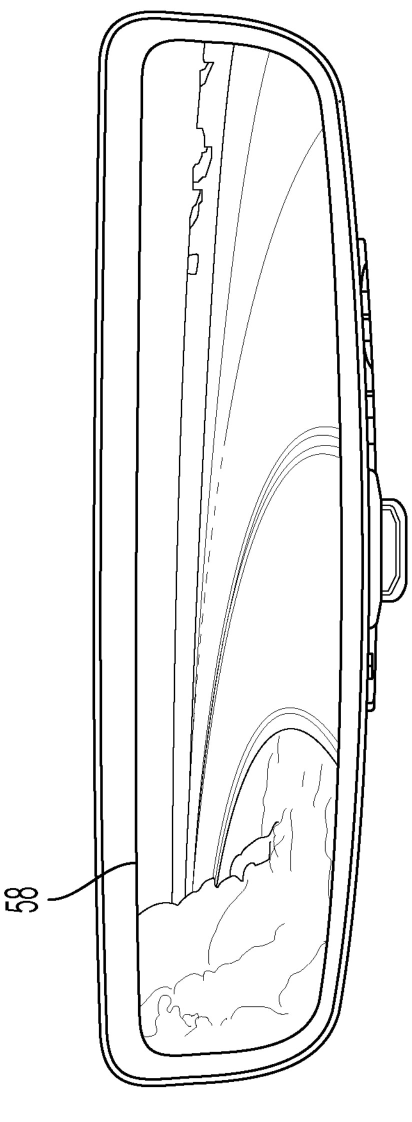
FIG. 9 is a perspective view of a mirror assembly having a video display screen and a perimeter hiding layer or band to render covert the perimeter seal of the mirror reflective element.
Figure 10:
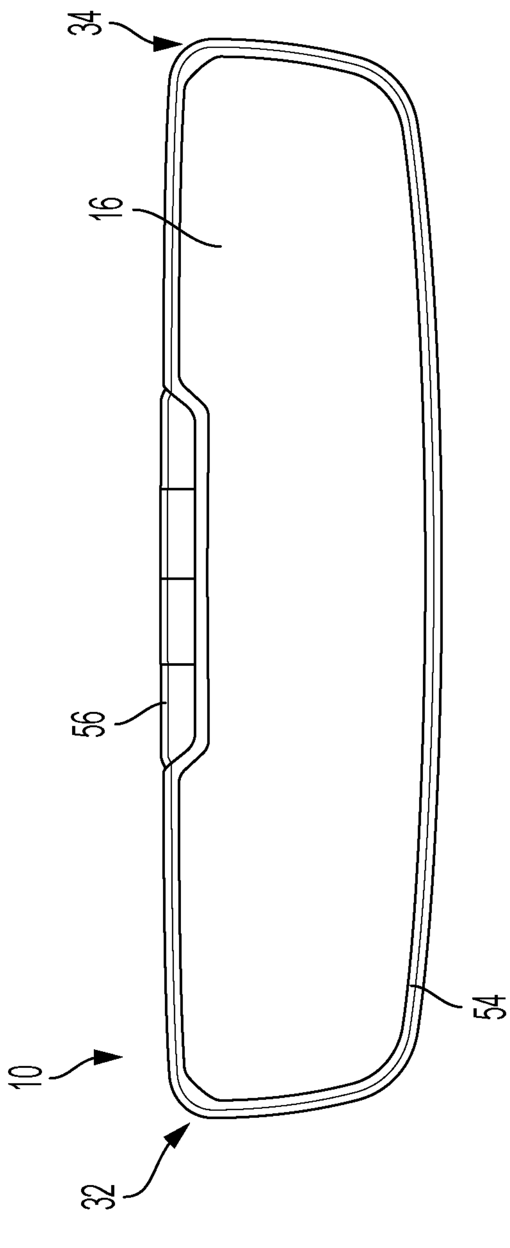
FIG. 10 is a perspective view of a mirror assembly having a button module along an upper edge region of the mirror reflective element.
Figure 11:
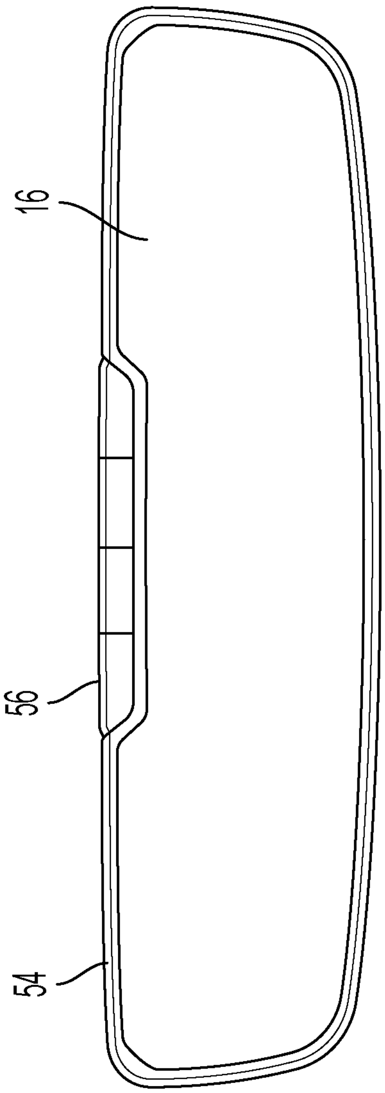
FIG. 11 is a perspective view of another mirror assembly having a button module along an upper edge region of the mirror reflective element.

As shown in FIGS. 4, 7, and 8, with the front substrate 20 mated with the rear substrate 22, the outer edges of the respective substrates are substantially aligned except at the first cutout region and the second cutout region (e.g., the peripheral edges of the front glass substrate are generally flush with the corresponding peripheral edges of the rear glass substrate, such as with less than a one millimeter overhang of the peripheral edges of the front glass substrate beyond the corresponding peripheral edges of the rear glass substrate). The edges of the mirror reflective element may be ground as an assembly, which causes the two piece electrochromic cell assembly to appear as if it is made from a single piece of glass. Thus, with the mirror reflective element received at the mirror casing 14, the outer edge of the mirror reflective element (i.e., the outer edges of the front and rear substrates) may align with an edge of the mirror casing 14 to provide a smooth transition between the mirror reflective element 16 and the mirror casing 14. In other words, the outer edge of the front substrate 20 may align with the outer edge of the rear substrate 22 that is aligned with the outer edge of the mirror casing 14. The outer perimeter edge of the front glass substrate is rounded or curved to provide a rounded smooth transition between the planar front or first surface of the front glass substrate and the outer perimeter edge of the rear glass substrate and/or the outer surface of the mirror casing.

At the first cutout region 32 and the second cutout region 34, a protrusion 14*a* of the mirror casing 14 may fit into the cutout regions of the rear glass substrate to provide the smooth transition between the edge of the front substrate 20 and the edge of the mirror casing 14. The protrusion 14*a* may act as a retaining feature for joining the mirror reflective element 16 and the mirror casing 14. In other words, the housing is made to precisely fit into the electrification corners, such as to appear as a clip type retention feature in the corner of the electrochromic mirror. These corners may be styled or duplicated in all four corners of the mirror assembly to provide a uniform appearance.

A reflective band 54 may be disposed at the second surface of the front substrate 20 and may extend along the outer edge region of the mirror reflective element to hide or render covert the electrical connectors, the joining material 36 and the seal 26. The reflective band 54 may be slightly widened at the cutout regions to conceal the protrusion 14*a* of the mirror casing 14. As shown in FIG. 4, the width of the reflective band 54 is narrowed compared to traditional mirror reflective elements because the front substrate is not offset compared to the rear substrate. In other words, by changing the structure of the glass and adapting the electrification, the offset between the front and rear substrates is reduced or substantially eliminated and the reflective band is narrowed.

That is, a mirror assembly (e.g., FIG. 3) may include a reflective band that is at least 5.5 millimeters or greater or at least 5.8 millimeters or greater in thickness. By providing electrical connection between the fourth surface and the third surface and/or the second surface at the first cutout region and the second cutout region with the outer edges of the front substrate and the rear substrate substantially aligned, the reflective band can be narrowed significantly, such as to 4.5 millimeters or less, 3.5 millimeters or less, or the like. A thickness of 4.5 millimeters may allow for manufacturing variation. For the purposes of electrification, the band can be widened (such as to about 5.5 millimeters or greater) at areas of the front substrate aligned with the first cutout region and the second cutout region (e.g., at the respective upper corner regions of the rear substrate). The greater band width at the point of electrification may allow for the molded plastic housing component or protrusion 14*a* to conceal the point of electrification. For example, the protrusion may be one millimeter or less, two millimeters or less and the like to fill the respective cutout region and align with the outer edge of the front substrate.

Referring to FIGS. 9-13, the mirror assembly 10 may include a button module or one or more buttons or user actuatable inputs 56 for controlling operation of one or more systems of the vehicle and/or accessories associated with the mirror assembly, such as to operate a hands free communication system of the vehicle or to operate the video display screen 58 of the mirror assembly. Some mirror assemblies (e.g., FIG. 9) include one or more buttons along a lower edge of the mirror head and outboard of the mirror reflective element.

The button module 56 is disposed along the upper edge region of the mirror reflective element 16 and may be substantially flush with the outer surface of the mirror reflective element 16. The front substrate and rear substrate may be notched or recessed along their respective upper edges to accommodate the button module 56. The reflective band 54 may extend along the upper edge region of the mirror reflective element 16 and between the button module 56 and the EC active area of the mirror reflective element 16 (e.g., FIG. 10). Optionally, the button module 56 at least partially overlaps the mirror reflective element 16, such that the reflective band 54 is disposed behind or hidden by the button module 56 or a gap is disposed between respective portions of the reflective band 54 to accommodate the button module 56 (e.g., FIG. 11). The button module 56 may be thin to accommodate the video display screen backlight that is disposed behind the button module 56, such as thin enough to fit within the thickness of the EC cell that is notched along the upper edge. As can be seen by comparing FIG. 10 to FIG. 9, the mirror reflective element 16 having a front substrate and rear substrate with substantially aligned or equal outer edges and the thinner reflective band 54 allows for a larger EC active area than other mirror assemblies and allows for the placement of the button module 56 along an edge region of the mirror reflective element and the mirror head.

Figure 12:
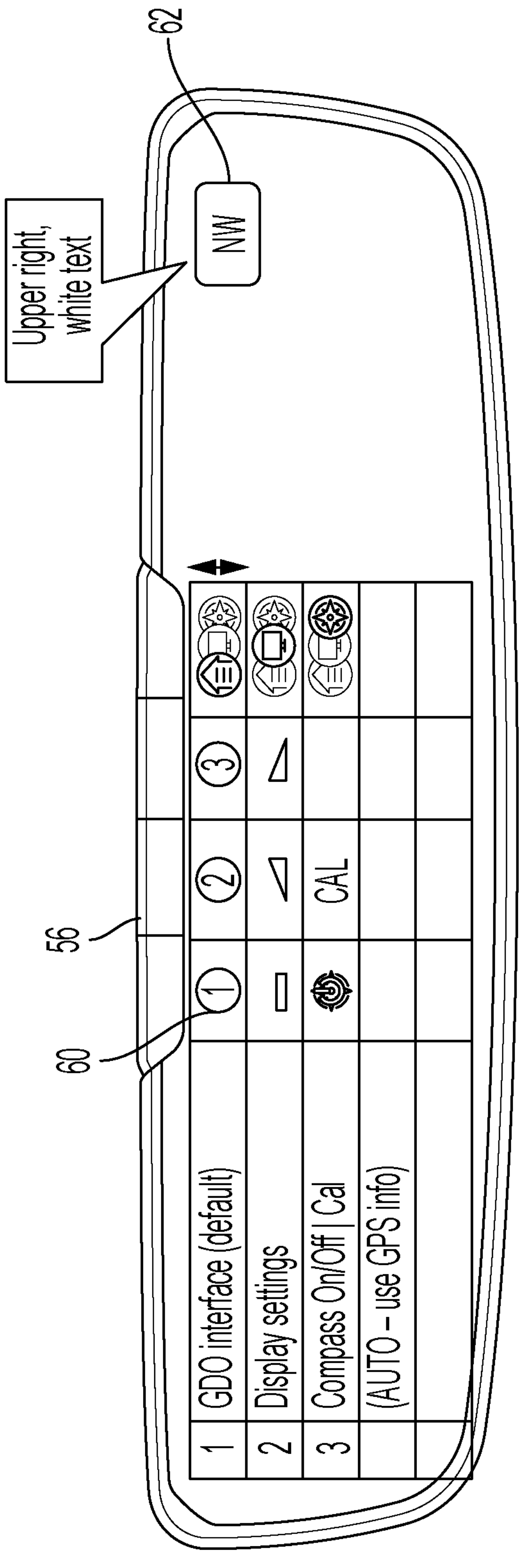
FIG. 12 is a schematic view of the mirror assembly having the button module, where icons are displayed at the video display screen of the mirror assembly to represent functionality associated with corresponding buttons.
Figure 13:
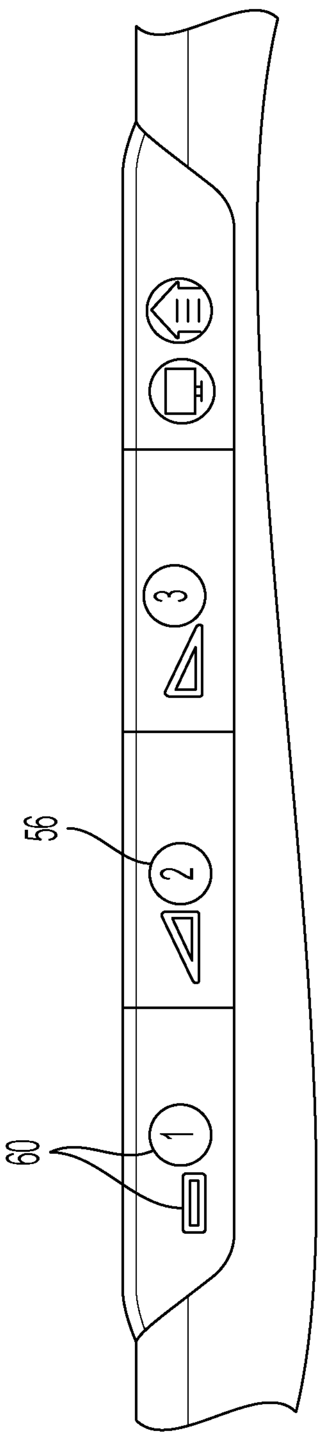
FIG. 13 is an enlarged view of the button module where the icons are displayed at the respective buttons.

As shown in FIGS. 12 and 13, icons or symbols 60 corresponding to a current function of each button 56 may be displayed at or near each respective button 56. For example, the icons 60 may be displayed at respective regions of the video display screen 58 adjacent the corresponding button 56 (e.g., beneath or above or alongside the button). Other images or graphics may also be displayed at the video display screen 58, such as a compass marker 62 indicating a direction of travel of the vehicle displayed in an upper corner of the display screen 58. The video display screen 58 may be operated to display the icons 60 (and optionally other images or graphics) when the mirror assembly is operating in any display mode (e.g., a traditional mirror mode where the mirror reflective element provides the rearward view to the driver or a video mirror mode where the display screen displays video images representative of the rearward view).

Because the icon 60 representing the function of the button 56 is displayed at the video display screen 58, the current function and the corresponding icon 60 may be adjusted or changed. For example, the buttons 56 may be operable in a garage door opener mode where each button is actuatable to cause transmission of a respective garage door opening signal, a display settings mode where each button is actuatable to adjust a respective setting of the video displays screen 58 (e.g., a brightness setting or a zoom setting), or a compass mode where each button is actuatable to control a respective operation of the compass indicator 62 (e.g., to turn the compass indicator on or off or calibrate the compass reading). Thus, the display and buttons and icons are reconfigurable based on the current function selected or actuated at the mirror assembly. In other words, the icon 60 corresponding to each button 56 may change based on the current functionality of the button 56. One of the buttons may be actuatable to change the functionality of the other buttons, and a respective icon 60 at that button may indicate the current operating mode of the button module.

During normal driving operation, the icons 60 may not be illuminated and the icons may be illuminated in response to a user input. For example, the icons 60 may be illuminated in response to a physical user input at one of the buttons 56 and/or the display screen 58. Once the icons 60 are illuminated, a second user input at one of the buttons 56 actuates the functionality of the button 56. Optionally, the icons 60 may be illuminated in response to determination (e.g., via processing of DMS camera image data) that the driver is viewing the display screen 58 and/or button module 56, and/or has viewed the display screen or button module 56 for at least a threshold period of time.

In some examples, the icons 60 may be displayed directly on or at the button 56. For example, a light source may be disposed behind the button 56 and operable to illuminate the icon 60 at the button 56. Thus, because the icons 60 may be illuminated without an initial user input, the first user input at the button 56 may activate the corresponding functionality. To reconfigure or adjust the functionality of the button 56, the light source may backlight a second icon 60 at the button 56. For example, the two (or more) icons may be disposed at different regions of the button surface and the light source may backlight different regions of the button to discretely illuminate the different icons. The light source may be operable to illuminate each icon 60 in a different color or otherwise distinguish the icons when the button module is operating in different modes.

In other words, the button module may provide functionality that is not limited by the number of physical buttons at the mirror assembly. For example, four buttons may function like six buttons or inputs (or like 9 buttons or inputs or more) where one button is a mode selector and the other three buttons provide the inputs for the different modes. When any one button is pressed, the display may be turned on to display the button function below each button (regardless of whether the mirror is operating in mirror mode, EC mode, or a display mode), then the button would be activated upon a second press. For example, the right-most button may be the mode switching button. When that is pressed, the icons below each button may change to the appropriate function icon and there may be an icon (or group of icons) to show when the setting mode is activated. Optionally, the buttons may remain illuminated regardless of the mirror operation mode such that the icons do not block the rearward view of the driver. Further, the icons may be at least partially transparent or opaque.

Optionally, to make the buttons immediately available without a second press, the button module may have multiple modes that are indicated by backlighting a separate backlighting zone within each button. For example, the primary function of the button may be indicated by a centered icon with an icon representing a secondary function offset. When the mode selector button is pressed, the backlights of the primary function icons (e.g., garage door openers) would turn off and the backlights of the secondary function icons (e.g., display settings) would illuminate. Each icon (two or more per button) may have a different color illumination. Then, the different functions would be selectable with appropriate on-screen feedback. The backlighting may flash or pulse or provide other suitable indication to confirm a button press or provide a feedback indication, such that the garage door is closing or opening, with confirmation in another color of illumination or flashing pattern. Moreover, a multicolor indicator could be used to backlight a single icon to show status of a particular item.

The buttons may be mechanical, using a tactile switch or metal (e.g., steel) dome or the like, or the buttons may be capacitive buttons. Capacitive buttons may provide a particularly thin button module. Further, the buttons may be contoured to help the user locate the center of the button prior to making the actual selection, such as to prevent the driver from having to look at the mirror when actuating like type capacitive buttons.

Figure 14:
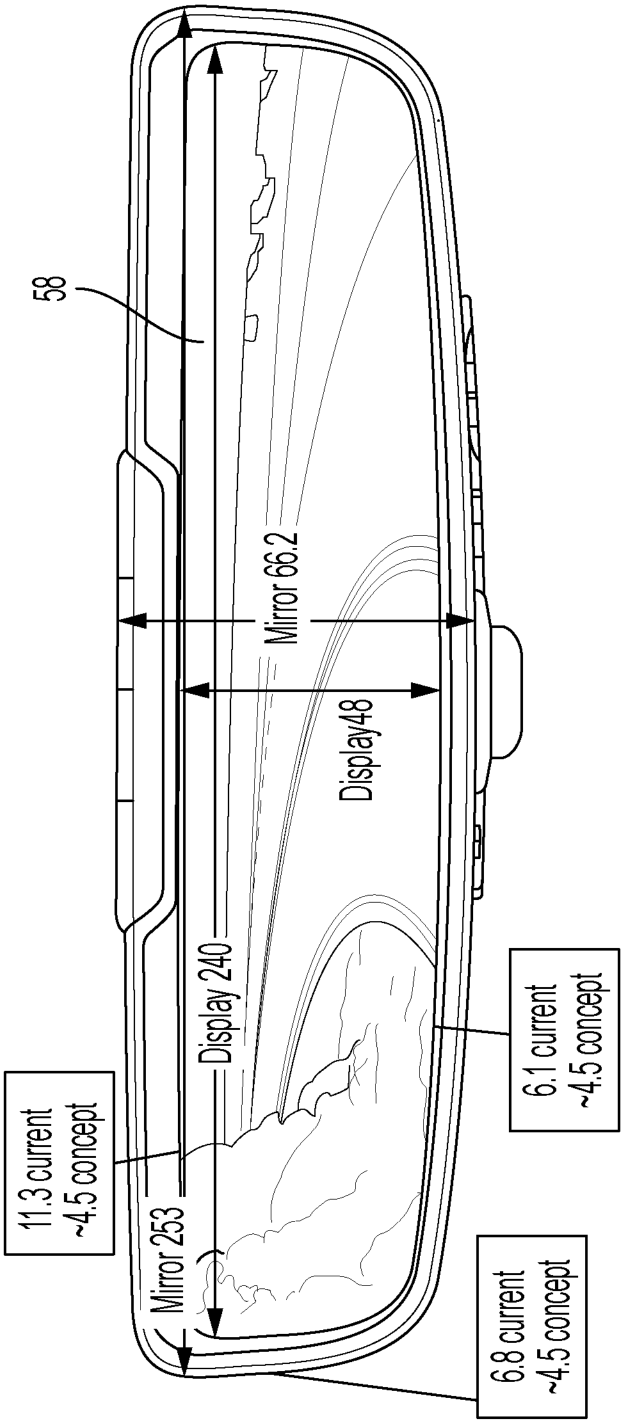
FIG. 14 is a perspective view of the mirror assembly with example dimensions.
Figure 15:
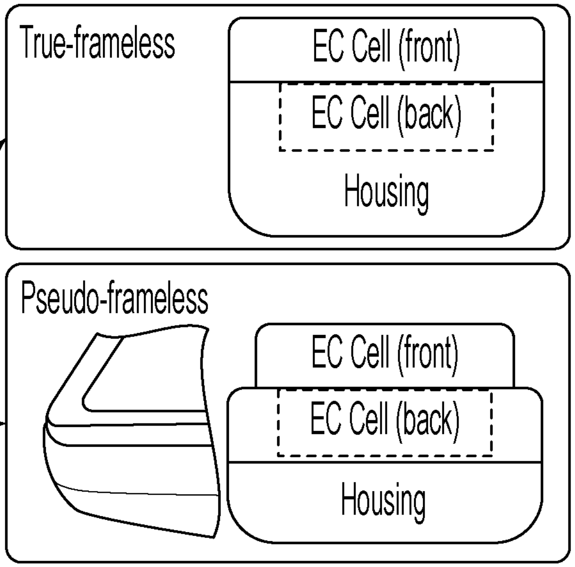
FIG. 15 is a chart showing example dimensions of the mirror assembly having different offsets between the front and rear substrates.

FIGS. 14 and 15 show the mirror assembly with example dimensions. For example, the mirror reflective element may have a reflective area with a length or width of 253 millimeters and a height of 66.2 millimeters. The video display area at the mirror reflective element may have a length or width of 240 millimeters and a height of 48 millimeters. The non-display portion of the mirror reflective element may be reduced to about 4.5 millimeters wide from about 6.1 millimeters to 11.3 millimeters wide. When the first substrate 20 and the second substrate 22 have an offset (e.g., of about 2.6 millimeters), this may allow for a frameless appearance where the housing does not extend past the glass around the perimeter region of the mirror assembly, and the reflective band 54 may have a width of about 6.1 millimeters or 4.5 millimeters or less. When the first substrate 20 and the second substrate 22 have a reduced offset (e.g., of about 1.3 millimeters), this may allow for a pseudo-frameless appearance where the housing extends past the glass around the perimeter region of the mirror assembly, and the reflective band 54 may have a width of about 4.8 millimeters. When the first substrate 20 and the second substrate 22 have no offset, the reflective band 54 may have a width of between about 3.5 millimeters and 4.0 millimeters.

The interior mirror assembly may comprise a dual-mode interior rearview video mirror that can switch from a traditional reflection mode to a live-video display mode, such as is by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety. The operating mode of the mirror and video display screen may be selected by flipping the mirror head upward or downward (e.g., via a toggle located at the mirror head) or responsive to another user input. When the mirror is operating in the mirror mode, the video display screen is deactivated and rendered covert by the mirror reflective element, and the driver views rearward via reflection of light incident at the mirror reflective element. When the mirror is operating in the display mode, the video display screen is operated to display video images that are viewable through the mirror reflective element by the driver of the vehicle.

The perimeter band may include an opaque or substantially opaque or hiding perimeter layer or coating or band disposed around the perimeter edge region of the front substrate (such as at the perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; 7,255,451; 8,508,831 and/or 8,730,553, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented.

Although shown and described as comprising an electrochromic mirror reflective element assembly having an electrochromic medium, it is envisioned that the mirror reflective element may comprise other types of electrically-variable transmission/reflectance mirror reflective elements or mirror reflective element assemblies, such as other electro-optic mirror reflective element assemblies, or a liquid crystal mirror reflective element assembly or the like.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324; 7,527,403 and/or 7,253,723, and/or U.S. Publication Nos. US-2014-0022390 and/or US-2014-0293169, which are hereby incorporated herein by reference in their entireties, or such as proximity sensors of the types described in U.S. Pat. Nos. 7,224,324; 7,249,860 and/or 7,446,924, and/or U.S. Publication No. US-2006-0050018, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,451; 6,504,531; 6,501,465; 6,492,980; 6,452,479; 6,437,258 and/or 6,369,804, which are hereby incorporated herein by reference in their entireties, and/or the like.

Changes and modifications in the specifically described embodiments may be carried out without departing from the principles of the present invention, which is intended to be limited only by the scope of the appended claims as interpreted according to the principles of patent law.

The invention claimed is:

1. A vehicular electrochromic rearview mirror assembly, the vehicular electrochromic rearview mirror assembly comprising:

a mirror head adjustable about a mounting structure, wherein the mounting structure is configured to mount the vehicular electrochromic rearview mirror assembly at an interior portion of an interior cabin of a vehicle;

wherein the mirror head accommodates an electrochromic mirror reflective element;

wherein, with the vehicular electrochromic rearview mirror assembly mounted at the interior portion of the interior cabin of the vehicle, the mirror head is adjustable by a driver of the vehicle to set a rearward view for the driver;

wherein the electrochromic mirror reflective element comprises (i) a front glass substrate having a first side and a second side separated from the first side by a thickness of the front glass substrate and (ii) a rear glass substrate having a third side and a fourth side separated from the third side by a thickness of the rear glass substrate;

wherein the front glass substrate has an outer peripheral edge that spans between the first side and the second side;

wherein the rear glass substrate has an outer peripheral edge that spans between the third side and the fourth side;

wherein the front glass substrate is joined with the rear glass substrate via a perimeter seal that bounds an electrochromic medium disposed in an interpane cavity between the front glass substrate and the rear glass substrate;

wherein the rear glass substrate has a first notched portion and a second notched portion;

wherein, with the front glass substrate joined with the rear glass substrate, corresponding portions of the front glass substrate extend beyond the first notched portion and the second notched portion of the rear glass substrate;

wherein a transparent electrically conductive coating is disposed at the second side of the front glass substrate and contacts the electrochromic medium;

wherein an electrically conductive coating is disposed at the third side of the rear glass substrate;

wherein the electrically conductive coating at the third side of the rear glass substrate comprises a first region and a second region, and wherein the first region is electrically isolated from the second region;

wherein the second region of the electrically conductive coating at the third side of the rear glass substrate contacts the electrochromic medium;

wherein the first region of the electrically conductive coating is disposed at a perimeter edge region of the third side of the rear glass substrate between the first notched portion and the second notched portion of the rear glass substrate;

wherein no part of the first region of the electrically conductive coating at the third side of the rear glass substrate is inboard of the perimeter seal and in contact with the electrochromic medium;

wherein the electrochromic medium is in electrical conductive contact with the transparent electrically conductive coating disposed at the second side of the front glass substrate and with the second region of the electrically conductive coating disposed at the third side of the rear glass substrate;

wherein a first electrically conductive connector is disposed at the first notched portion of the rear glass substrate and electrically conductively connects between the first region of the electrically conductive coating at the third side of the rear glass substrate and a first electrical connector at the fourth side of the rear glass substrate;

wherein a second electrically conductive connector is disposed at the second notched portion of the rear glass substrate and electrically conductively connects between the second region of the electrically conductive coating at the third side of the rear glass substrate and a second electrical connector at the fourth side of the rear glass substrate; and wherein the first region of the electrically conductive coating at the perimeter edge region of the third side of the rear glass substrate is electrically conductively connected to the transparent electrically conductive coating at the second side of the front glass substrate via electrically conductive material disposed at least partially along the first region and contacting the transparent electrically conductive coating at the second side of the front glass substrate.

2. The vehicular electrochromic rearview mirror assembly of claim 1, wherein the first region of the electrically conductive coating at the third side of the rear glass substrate comprises a plurality of protrusions that protrude outboard of the perimeter seal, and wherein electrically conductive material is disposed at the plurality of protrusions and contacting the transparent electrically conductive coating.

3. The vehicular electrochromic rearview mirror assembly of claim 2, wherein the perimeter seal is disposed along the first region and between adjacent protrusions of the plurality of protrusions such that only the plurality of protrusions of the first region of the electrically conductive material protrude outboard of the perimeter seal.

4. The vehicular electrochromic rearview mirror assembly of claim 1, wherein a mirror reflector is disposed at the third side of the rear glass substrate, and wherein the electrically conductive coating comprises the mirror reflector.

5. The vehicular electrochromic rearview mirror assembly of claim 1, wherein a mirror reflector is disposed at the fourth side of the rear glass substrate.

6. The vehicular electrochromic rearview mirror assembly of claim 1, wherein, when the first electrically conductive connector is electrically charged, the first region of the electrically conductive coating is electrically charged along the perimeter edge region of the third side of the rear glass substrate.

7. The vehicular electrochromic rearview mirror assembly of claim 1, wherein an ablation line is formed along the electrically conductive coating at the third side of the rear glass substrate to electrically isolate the first region and the second region.

8. The vehicular electrochromic rearview mirror assembly of claim 7, wherein the perimeter seal extends at least partially within the ablation line.

9. The vehicular electrochromic rearview mirror assembly of claim 1, wherein a hiding layer is disposed at a perimeter edge region of the second side of the front glass substrate.

10. The vehicular electrochromic rearview mirror assembly of claim 9, wherein the hiding layer is disposed at the corresponding portions of the front glass substrate that extend beyond the first notched portion and the second notched portion of the rear glass substrate.

11. The vehicular electrochromic rearview mirror assembly of claim 9, wherein a width dimension of the hiding layer is less than 5 mm.

12. The vehicular electrochromic rearview mirror assembly of claim 9, wherein the hiding layer comprises a reflective hiding layer.

13. The vehicular electrochromic rearview mirror assembly of claim 9, wherein the hiding layer at the perimeter edge region of the second side of the front glass substrate is aligned with the first region of the electrically conductive coating at the perimeter edge region of the third side of the rear glass substrate.

14. The vehicular electrochromic rearview mirror assembly of claim 1, wherein, at a widest portion of the electrochromic mirror reflective element, a width dimension of the front glass substrate is no greater than a corresponding width dimension of the rear glass substrate.

15. The vehicular electrochromic rearview mirror assembly of claim 1, wherein the mirror head comprises a mirror casing, and wherein an outer edge of the mirror casing aligns with the outer peripheral edge of the front glass substrate and the outer peripheral edge of the rear glass substrate.

16. The vehicular electrochromic rearview mirror assembly of claim 15, wherein the mirror casing comprises (i) a first protrusion that is received within the first notched portion of the rear glass substrate and aligns with the outer peripheral edge of the front glass substrate and (ii) a second protrusion that is received within the second notched portion of the rear glass substrate and aligns with the outer peripheral edge of the front glass substrate.

17. The vehicular electrochromic rearview mirror assembly of claim 1, wherein the mirror head accommodates a user input module, and wherein the user input module is disposed at least partially along a cutout region along the outer peripheral edge of the front glass substrate and the outer peripheral edge of the rear glass substrate.

18. The vehicular electrochromic rearview mirror assembly of claim 17, wherein the user input module is flush with the first side of the front glass substrate.

19. The vehicular electrochromic rearview mirror assembly of claim 17, wherein a video display screen is disposed behind the electrochromic mirror reflective element, and wherein the video display screen is electrically operable to illuminate an icon representative of a function of a corresponding button of the user input module.

20. The vehicular electrochromic rearview mirror assembly of claim 19, wherein the icon is adjustable based on reconfiguration of the function of the corresponding button of the user input module.

21. The vehicular electrochromic rearview mirror assembly of claim 1, wherein the first notched portion is at a first corner region of the rear glass substrate and the second notched portion is at a second corner region of the rear glass substrate, and wherein the second corner region is at an opposite corner of the rear glass substrate than the first corner region.

22. The vehicular electrochromic rearview mirror assembly of claim 21, wherein, with the vehicular electrochromic rearview mirror assembly mounted at the interior portion of the interior cabin of the vehicle, the first corner region and the second corner region correspond to respective upper corners of the rear glass substrate.

23. The vehicular electrochromic rearview mirror assembly of claim 21, wherein, with the vehicular electrochromic rearview mirror assembly mounted at the interior portion of the interior cabin of the vehicle, the first corner region and the second corner region correspond to respective lower corners of the rear glass substrate.

24. The vehicular electrochromic rearview mirror assembly of claim 1, wherein an offset between the outer peripheral edge of the front glass substrate and the outer peripheral edge of the rear glass substrate is less than one millimeter, and wherein the offset is at least one selected from the group consisting of (i) at an upper region of the electrochromic mirror reflective element and (ii) at a lower region of the electrochromic mirror reflective element.

25. The vehicular electrochromic rearview mirror assembly of claim 1, wherein an offset between the outer peripheral edge of the front glass substrate and the outer peripheral edge of the rear glass substrate is less than 0.5 millimeters, and wherein the offset is at least one selected from the group consisting of (i) at an upper region of the electrochromic mirror reflective element and (ii) at a lower region of the electrochromic mirror reflective element.

26. A vehicular electrochromic rearview mirror assembly, the vehicular electrochromic rearview mirror assembly comprising:

- a mirror head adjustable about a mounting structure, wherein the mounting structure is configured to mount the vehicular electrochromic rearview mirror assembly at an interior portion of an interior cabin of a vehicle;
- wherein the mirror head accommodates an electrochromic mirror reflective element;
- wherein, with the vehicular electrochromic rearview mirror assembly mounted at the interior portion of the interior cabin of the vehicle, the mirror head is adjustable by a driver of the vehicle to set a rearward view for the driver;
- wherein the electrochromic mirror reflective element comprises (i) a front glass substrate having a first side and a second side separated from the first side by a thickness of the front glass substrate and (ii) a rear glass substrate having a third side and a fourth side separated from the third side by a thickness of the rear glass substrate;
- wherein the front glass substrate has an outer peripheral edge that spans between the first side and the second side;
- wherein the rear glass substrate has an outer peripheral edge that spans between the third side and the fourth side;
- wherein the front glass substrate is joined with the rear glass substrate via a perimeter seal that bounds an electrochromic medium disposed in an interpane cavity between the front glass substrate and the rear glass substrate;
- wherein the rear glass substrate has a first notched portion and a second notched portion;
- wherein, with the front glass substrate joined with the rear glass substrate, corresponding portions of the front glass substrate extend beyond the first notched portion and the second notched portion of the rear glass substrate;

wherein a transparent electrically conductive coating is disposed at the second side of the front glass substrate and contacts the electrochromic medium;

wherein an electrically conductive coating is disposed at the third side of the rear glass substrate;

wherein the electrically conductive coating at the third side of the rear glass substrate comprises a first region and a second region, and wherein the first region is electrically isolated from the second region;

wherein an ablation line is formed along the electrically conductive coating at the third side of the rear glass substrate to electrically isolate the first region and the second region, and wherein the perimeter seal extends at least partially within the ablation line;

wherein the second region of the electrically conductive coating at the third side of the rear glass substrate contacts the electrochromic medium;

wherein the first region of the electrically conductive coating is disposed at a perimeter edge region of the third side of the rear glass substrate between the first notched portion and the second notched portion of the rear glass substrate;

wherein no part of the first region of the electrically conductive coating at the third side of the rear glass substrate is inboard of the perimeter seal and in contact with the electrochromic medium;

wherein the electrochromic medium is in electrical conductive contact with the transparent electrically conductive coating disposed at the second side of the front glass substrate and with the second region of the electrically conductive coating disposed at the third side of the rear glass substrate;

wherein a first electrically conductive connector is disposed at the first notched portion of the rear glass substrate and electrically conductively connects between the first region of the electrically conductive coating at the third side of the rear glass substrate and a first electrical connector at the fourth side of the rear glass substrate;

wherein a second electrically conductive connector is disposed at the second notched portion of the rear glass substrate and electrically conductively connects between the second region of the electrically conductive coating at the third side of the rear glass substrate and a second electrical connector at the fourth side of the rear glass substrate; and wherein the first region of the electrically conductive coating at the perimeter edge region of the third side of the rear glass substrate comprises a plurality of protrusions that protrude outboard of the perimeter seal, and wherein electrically conductive material is disposed at the plurality of protrusions and contacting the transparent electrically conductive coating at the second side of the front glass substrate to electrically conductively connect the first region of the electrically conductive coating at the perimeter edge region of the third side of the rear glass substrate and the transparent electrically conductive coating at the second side of the front glass substrate.

27. The vehicular electrochromic rearview mirror assembly of claim 26, wherein the perimeter seal is disposed along the first region and between adjacent protrusions of the plurality of protrusions such that only the plurality of protrusions of the first region of the electrically conductive material protrude outboard of the perimeter seal.

28. The vehicular electrochromic rearview mirror assembly of claim 26, wherein, when the first electrically conductive connector is electrically charged, the first region of the electrically conductive coating is electrically charged along the perimeter edge region of the third side of the rear glass substrate.

29. The vehicular electrochromic rearview mirror assembly of claim 26, wherein a hiding layer is disposed at a perimeter edge region of the second side of the front glass substrate.

30. The vehicular electrochromic rearview mirror assembly of claim 26, wherein, at a widest portion of the electrochromic mirror reflective element, a width dimension of the front glass substrate is no greater than a corresponding width dimension of the rear glass substrate.

31. A vehicular electrochromic rearview mirror assembly, the vehicular electrochromic rearview mirror assembly comprising:

a mirror head adjustable about a mounting structure, wherein the mounting structure is configured to mount the vehicular electrochromic rearview mirror assembly at an interior portion of an interior cabin of a vehicle;

wherein the mirror head accommodates an electrochromic mirror reflective element;

wherein, with the vehicular electrochromic rearview mirror assembly mounted at the interior portion of the interior cabin of the vehicle, the mirror head is adjustable by a driver of the vehicle to set a rearward view for the driver;

wherein the electrochromic mirror reflective element comprises (i) a front glass substrate having a first side and a second side separated from the first side by a thickness of the front glass substrate and (ii) a rear glass substrate having a third side and a fourth side separated from the third side by a thickness of the rear glass substrate;

wherein the front glass substrate has an outer peripheral edge that spans between the first side and the second side;

wherein the rear glass substrate has an outer peripheral edge that spans between the third side and the fourth side;

wherein the front glass substrate is joined with the rear glass substrate via a perimeter seal that bounds an electrochromic medium disposed in an interpane cavity between the front glass substrate and the rear glass substrate;

wherein the rear glass substrate has (i) a first notched portion at a first corner region of the rear glass substrate and (ii) a second notched portion at a second corner region of the rear glass substrate, and wherein the second corner region is at an opposite corner of the rear glass substrate than the first corner region;

wherein, with the front glass substrate joined with the rear glass substrate, corresponding portions of the front glass substrate extend beyond the first notched portion and the second notched portion of the rear glass substrate;

wherein the mirror head comprises a mirror casing, and wherein the mirror casing comprises (i) a first protrusion that is received within the first notched portion of the rear glass substrate and aligns with the outer peripheral edge of the front glass substrate and (ii) a second protrusion that is received within the second notched portion of the rear glass substrate and aligns with the outer peripheral edge of the front glass substrate;

wherein a transparent electrically conductive coating is disposed at the second side of the front glass substrate and contacts the electrochromic medium;

wherein an electrically conductive coating is disposed at the third side of the rear glass substrate;

wherein the electrically conductive coating at the third side of the rear glass substrate comprises a first region and a second region, and wherein the first region is electrically isolated from the second region;

wherein the second region of the electrically conductive coating at the third side of the rear glass substrate contacts the electrochromic medium;

wherein the first region of the electrically conductive coating is disposed at a perimeter edge region of the third side of the rear glass substrate between the first notched portion and the second notched portion of the rear glass substrate;

wherein no part of the first region of the electrically conductive coating at the third side of the rear glass substrate is inboard of the perimeter seal and in contact with the electrochromic medium;

wherein the electrochromic medium is in electrical conductive contact with the transparent electrically conductive coating disposed at the second side of the front glass substrate and with the second region of the electrically conductive coating disposed at the third side of the rear glass substrate;

wherein a first electrically conductive connector is disposed at the first notched portion of the rear glass substrate and electrically conductively connects between the first region of the electrically conductive coating at the third side of the rear glass substrate and a first electrical connector at the fourth side of the rear glass substrate;

wherein a second electrically conductive connector is disposed at the second notched portion of the rear glass substrate and electrically conductively connects between the second region of the electrically conductive coating at the third side of the rear glass substrate and a second electrical connector at the fourth side of the rear glass substrate; and wherein the first region of the electrically conductive coating at the perimeter edge region of the third side of the rear glass substrate is electrically conductively connected to the transparent electrically conductive coating at the second side of the front glass substrate via electrically conductive material disposed at least partially along the first region and contacting the transparent electrically conductive coating at the second side of the front glass substrate.

32. The vehicular electrochromic rearview mirror assembly of claim 31, wherein the first region of the electrically conductive coating at the third side of the rear glass substrate comprises a plurality of protrusions that protrude outboard of the perimeter seal, and wherein electrically conductive material is disposed at the plurality of protrusions and contacting the transparent electrically conductive coating.

33. The vehicular electrochromic rearview mirror assembly of claim 31, wherein, when the first electrically conductive connector is electrically charged, the first region of the electrically conductive coating is electrically charged along the perimeter edge region of the third side of the rear glass substrate.

34. The vehicular electrochromic rearview mirror assembly of claim 31, wherein an ablation line is formed along the electrically conductive coating at the third side of the rear glass substrate to electrically isolate the first region and the second region.

35. The vehicular electrochromic rearview mirror assembly of claim 31, wherein a hiding layer is disposed at a perimeter edge region of the second side of the front glass substrate.

36. The vehicular electrochromic rearview mirror assembly of claim 35, wherein the hiding layer is disposed at the corresponding portions of the front glass substrate that extend beyond the first notched portion and the second notched portion of the rear glass substrate.

37. The vehicular electrochromic rearview mirror assembly of claim 31, wherein an outer edge of the mirror casing aligns with the outer peripheral edge of the front glass substrate and the outer peripheral edge of the rear glass substrate.

38. The vehicular electrochromic rearview mirror assembly of claim 31, wherein, with the vehicular electrochromic rearview mirror assembly mounted at the interior portion of the interior cabin of the vehicle, the first corner region and the second corner region correspond to respective upper corners of the rear glass substrate.

39. The vehicular electrochromic rearview mirror assembly of claim 31, wherein, with the vehicular electrochromic rearview mirror assembly mounted at the interior portion of the interior cabin of the vehicle, the first corner region and the second corner region correspond to respective lower corners of the rear glass substrate.

* * * * *